Nov. 14, 1967    J. C. BLISS ET AL    3,353,027
AIMING DEVICE
Filed Nov. 9, 1964
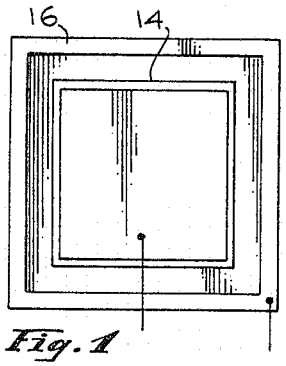
Fig. 1
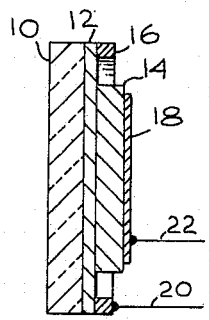
Fig. 2
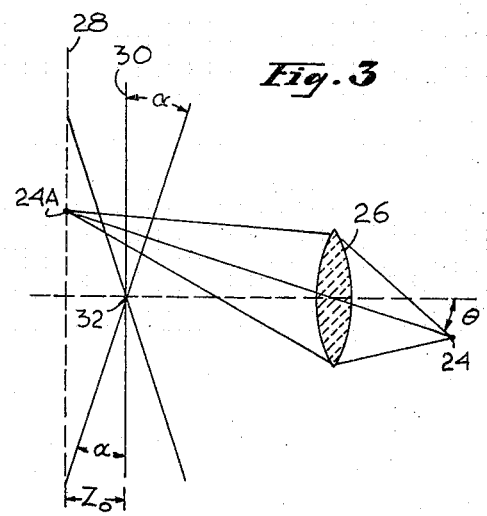
Fig. 3
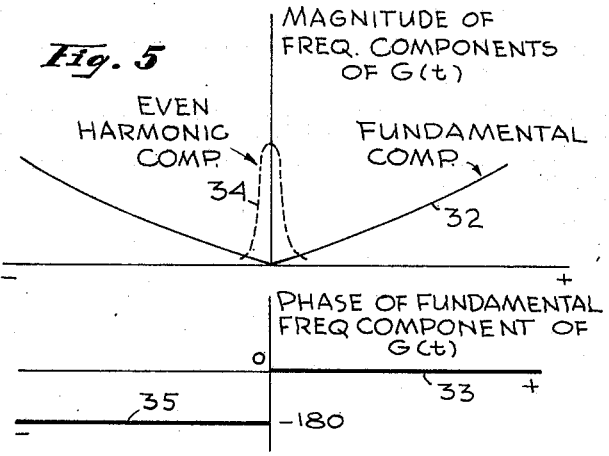
Fig. 5
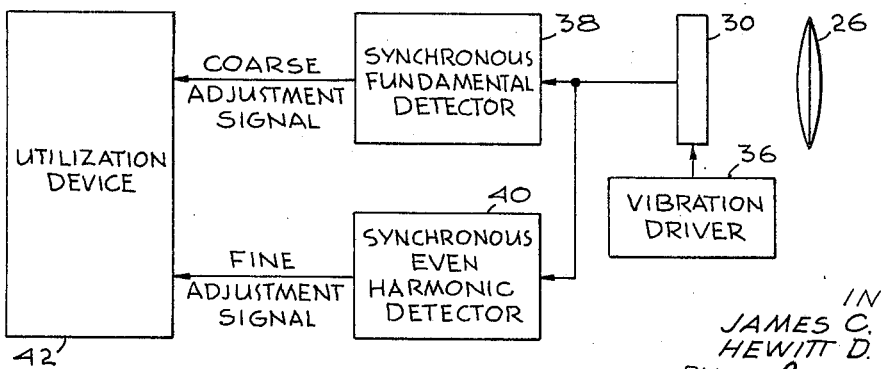
Fig. 4
Fig. 6
INVENTORS
JAMES C. BLISS
HEWITT D. CRANE
BY Samuel Lindenberg
ATTORNEY

United States Patent Office 3,353,027
Patented Nov. 14, 1967

3,353,027
AIMING DEVICE
James C. Bliss, Los Altos, and Hewitt D. Crane, Portola Valley, Calif., assignors to Stanford Research Institute, Menlo Park, Calif., a corporation of California
Filed Nov. 9, 1964, Ser. No. 409,726
5 Claims. (Cl. 250—235)

ABSTRACT OF THE DISCLOSURE

An apparatus for determining the position of an object in which a nonlinear photocell is oscillated in a rotary mode to scan the image field of a lens. The photocell is placed parallel to the focus plane of the lens but displaced therefrom so that the oscillation of the photocell modulates the sharpness of the image focused on its surface. The nonlinear response of the photocell makes it sensitive to image sharpness so that a modulated output is provided which can be synchronously detected to provide an indication of the object position relative to the optical axis of the lens.

This invention relates to photoelectric apparatus for determining the position of an object, and more particularly to improvements therein.

An object of this invention is the provision of a novel apparatus for determining the position of an object relative to a reference position.

Yet another object of the present invention is the provision of an improved photoelectric apparatus for determining the position of a target relative to a reference.

Yet another object of the present invention is the provision of a photoelectric target detection device which is more sensitive than those used heretofore.

Still another object of the present invention is the provision of a simple and unique photoconductive detecting apparatus for target position detection.

These and other objects of the present invention may be achieved in an arrangement wherein a nonlinear photocell is placed relative to a lens which focuses the target image thereon at a distance which is displaced from the plane of focus of the lens. The nonlinear photocell may be oscillated about an axis which is orthogonal to the optic axis of the lens. The nonlinear photocell can then produce output signals which are uniquely characteristic of the location of a target, the light from which reaches the photocell through the lens. These signals indicate both that the target is displaced from the optical axis as well as on which side of the optical axis the target is located.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 and FIGURE 2 respectively are front and side views illustrating a nonlinear photocell of the type which may be employed in the present invention;

FIGURE 3 is a schematic drawing shown to illustrate the concept of this invention;

FIGURE 4 is a drawing showing representative waveshapes which are derived from an operation of the invention which are used to detect target position;

FIGURE 5 is a drawing showing how the magnitude and phase of the frequency components of the photocell signal change with target position; and FIGURE 6 is a schematic representation of an embodiment of the invention.

FIGURES 1 and 2 exemplify the construction of a nonlinear photocell which may be employed with this invention. This construction exemplifies only one of several different types of photocells which may be employed, and therefore is not to be construed as a limitation on the invention. A nonlinear photocell is one wherein the total conductance of the cell G depends both on the particular distribution of the light which is shining on the cell, as well as its intensity. Considering now FIGURE 1 and FIGURE 2 of the drawings, they show, by way of example, the construction for a nonlinear photocell. This comprises a glass substrate 10 on one side of which there is coated a transparent conductive layer of material 12. This material may be the well-known Nesa material. A layer of nonlinear photoconductive material 14 is next deposited over a region of the coated glass plate which is less in area than the conductive coating so that a collecting electrode 16 may be placed on the edge of the conductive coating all around the region of the photoconductive material without contacting the photoconductive material. On the back of the photoconductive material, there is deposited a layer of a low resistance metal 18 which serves as a back electrode. Lead wires 20, 22 are respectively connected to the electrodes 16, 18.

Let $g(x, y)$ be the conductivity of the photoconductive layer at point $(x, y)$ in response to light intensity $I(x, y)$. The total conductance of the cell, measured between the pair of plate electrodes 16, 18 is expressed as $$G = \int_A g(x, y) dx\, dy \qquad (1)$$

where A is the area of the cell. If $g$ depends linearly on the light intensity (e.g., a photocell model characterized by $g = kI(x, y)$, where $I(x, y)$ is the illumination of point $x, y$ on the photoconductive area and $k$ is a constant) then Equation 1 reduces simply to $$G = kL_T \qquad (2)$$

where $L_T$ is the total incident light flux. With $g$ a nonlinear function of intensity, however—e.g., the photocell model $$g = kI^p \qquad (3)$$

where $p$ is a constant—then G also depends on the particular distribution of light as well.

Consider now FIGURE 3 which is a representation of the concept of this invention. Consider a point source object 24 which is displaced by an angle $\theta$ from the optic axis of a lens 26, and which is focused by that lens on the focus plane 28 of the lens at the point 24A. A nonlinear photocell 30 which is wide enough to receive light over an area of the lens is displaced from the focus plane 28 by a distance $z_0$ therefrom. Consider that the photocell 30 is oscillated through an angle $\pm \alpha$ about an axis 32 which is orthogonal to the optic axis of the lens. It will be seen from the drawing that when $\theta$ is greater than 0, as the photocell oscillates through a total peak-to-peak swing of $2\alpha$, the patch of light intercepted on the photocell from the point source 24 becomes alternately larger and smaller, with corresponding dimming and brightening of the intercepted image though the total light intercepted remains constant. For $p > 1$ in Equation 3 it can be expected that the cell conductance should increase with a decrease in the size of the patch of light and should decrease with an increase in the size of the patch of light. Thus, a substantially monotonic following of the cell conductance with the vibration can be expected.

An investigation of the output of the photocell for various values of $\theta$ may be seen in FIGURE 4. The curves 34A through 34G were obtained by plotting the photocell output as a function of time for different values of $\theta$. Curve 34H represents the photocell vibration, a plot of $\alpha(t)$. It will be seen that when $\theta > 0$, waveshapes 34A and 34G, corresponding to $\theta = \pm 5.2$ minutes of arc, the output substantially follows the photocell vibration except for a 180° phase change on either side of $\theta=0$. However, for values of $\theta$ close to $\theta=0$, the courves are folded over. At $\theta=0$ the output curve is completely folded over and the output signal is the same for the positive and negative half cycles of vibration. Fold-over results in large even harmonics in the photocell signal. A plot of fundamental component of the signal versus angle $\theta$ will have the waveform 32 sketched by the solid line in FIGURE 5, whereas the plot of total even harmonics versus angle $\theta$ will have the waveform 34 shown dashed on the same figure, where, for the case shown, the even harmonic curve is approximately zero for $\theta \gtrsim$ about five minutes of arc. The phases of the fundamental of frequency for $\pm \alpha$ are represented by the lines 31, 35.

Thus, as shown in FIGURE 6, a motor 36 oscillates the nonlinear photocell 30. By applying the photocell output signal to a synchronous detector 30 to abstract a measure of the fundamental component of the photocell signal, one can determine the direction of aiming error—the signal from the detector being of one polarity for one direction of aiming error, and of the opposite polarity for the other direction of aiming error. The detector output will be larger, the larger the aiming error.

By applying the same photocell signal to a synchronous detector 40 to abstract a measure of the even-harmonic components of the photocell signal, the output as a function of $\theta$ will have the form 34 shown dashed in FIGURE 5. This signal can therefore be used for more accurate aiming when $\theta$ is close to zero.

In addition, when the target is very nearly aligned to the axis of the optical system, even-harmonic signals are generated which permit a very sensitive indication of the nearness to alignment. The even-harmonic components have a maximum amplitude when the target is aligned with the optical axis, and the amplitude of the even harmonic signals decreases rapidly on either side of alignment. Thus, the utilization device could use the output of the fundamental synchronous detector as a rough course indication when the target is considerably off-axis and the output of the even harmonic synchronous detector as a sensitive indicator when the target is close to being on-axis.

The output from the nonlinear photocell 30 is applied to synchronous detectors 38 and 40, the output from which is a signal having the amplitude and polarity as determined by the amplitude and phase of the input thereto. This may be applied to the utilization device 42. The utilization device may be an indicator which indicates the direction and, if the light intensity is known, the extent a target is off of the optical axis or when the target is on the optical axis, from which information other apparatus may be aimed. It will be noted in FIGURES 4 and 5 that not only does the phase of the fundamental signal generated by the oscillating photocell differ for different positions of the object, but also the amplitude of the fundamental signal increases with increasing displacement from the optical axis. Thus, with a precalibrated target, one can get a measure of an angular displacement off-axis by also directing the peak-to-peak swing obtained at a particular value of $\theta$.

It should be apparent that by using two oscillating nonlinear photocells whose axes are orthogonal to the optic axis and orthogonal to each other, or by vibrating a single nonlinear photocell first about one axis and then about an orthogonal axis, or by processing a single cell, a sensitivity to angular displacement in any direction from the optic axis may be achieved. If desired, the utilization device 42 may comprise a servocontrol system having the function of moving the lens and oscillating photocell in a direction to bring the target onto the optic axis. Techniques of this type are well known today.

It should be appreciated that useful operation can be obtained for other than a single point source target. For example, with two identical point sources, the same distance from the lens, maximum fold-over will occur when the "center of light," in analogy to the "center of mass," is aligned with the optical axis. As another example, if the target is a uniformly luminous annulus, the maximum fold-over signals will be obtained when the center of the annulus is aligned with the optical axis. It should be clear that for any given target shape and lumination distribution, maximum fold-over signals will be obtained when the axis of the optical system is aimed directly at some unique point characteristic of the target.

If the axis of photocell vibration is displaced from the optical axis, then a fixed angular offset will be introduced into the output of the system. By establishing a desired fixed angular offset, the target position at which maximum fold-over signals are obtained can be adjusted or established.

There has accordingly been described and shown herein a novel, useful and simple system whereby the direction of a target off axis may be readily determined by simply noting the phase of the conductance signal which is generated by an oscillating nonlinear photocell. Further, the same nonlinear photocell can be used in a servosystem for accurately aiming and maintaining accurate aiming in the direction of the target. In the case of a complex object shape, i.e., not simply a point source, the apparatus will aim at a well defined central point of the object.

What is claimed is:

1. Apparatus for determining the direction of an object from a predetermined line comprising a lens having its optical axis coincide with said predetermined line, a nonlinear photocell spaced from said lens and adjacent the focus plane of said lens, means for oscillating in a rotary mode said nonlinear photocell about an axis passing therethrough, and means for deriving an electrical output from said photocell indicative of the angular displacement of said object from the optical axis of said lens.

2. Apparatus for determining the direction of an object from a predetermined line comprising a lens having its optical axis coincide with said predetermined line, a nonlinear photocell spaced from said lens and adjacent the focus plane of said lens, means for oscillating in a rotary mode said nonlinear photocell about an axis which is orthogonal to the optical axis of said lens, and means for deriving an electrical output from said photocell indicative of the angular displacement of said object from the optical axis of said lens.

3. Apparatus for determining the location of an object relative to the optic axis of a lens which images said object on its focal plane comprising a nonlinear photocell positioned adjacent said focal plane for intercepting thereon the image of said object from said lens, means for oscillating in a rotary mode said nonlinear photocell about an axis which is orthogonal to the optical axis of said lens, and means for deriving an output signal from said oscillating nonlinear photocell indicative of the location of said object relative to said optic axis.

4. Apparatus for determining the location of an object as recited in claim 3 wherein said means for deriving an output signal from said oscillating nonlinear photocell comprises an even-harmonic synchronous detector.

5. Apparatus for determining the location of an object as recited in claim 3 wherein said means for deriving an output signal from said oscillating nonlinear photocell comprises a fundamental harmonic synchronous detector.

References Cited

UNITED STATES PATENTS

| 2,897,722 | 8/1959 | Gunter et al. | 88—56 |
| 3,020,411 | 2/1962 | McKnight et al. | 250—235 |
| 3,259,751 | 7/1966 | Sachs | 250—203 X |

RALPH G. NILSON, *Primary Examiner.*

DAVID J. WALL, *Examiner.*